United States Patent [19]
Landi et al.

[11] Patent Number: 5,756,182
[45] Date of Patent: May 26, 1998

[54] METHOD AND APPARATUS FOR MASKING THE ACOUSTIC SIGNATURE OF VESSELS

[75] Inventors: Curtis L. Landi; Susan L. Wilson, both of Sunnyvale, Calif.

[73] Assignee: Supracor Systems, Inc., San Jose, Calif.

[21] Appl. No.: 549,321

[22] Filed: Oct. 27, 1995

Related U.S. Application Data

[63] Continuation of Ser. No. 3,791, Jan. 13, 1993, abandoned, which is a continuation-in-part of Ser. No. 717,523, Jun. 19, 1991, Pat. No. 5,180,619, which is a continuation-in-part of Ser. No. 446,320, Dec. 4, 1989, Pat. No. 5,039,567.

[51] Int. Cl.$^6$ ........................................ B32B 3/12
[52] U.S. Cl. .............. 428/116; 52/793.1; 156/197; 156/292; 428/131; 493/966; 181/292
[58] Field of Search ............. 52/793.1; 156/197, 156/292; 181/292; 428/73, 116, 118, 131; 493/966

[56] References Cited

U.S. PATENT DOCUMENTS

| | | | |
|---|---|---|---|
| 3,007,834 | 11/1961 | Moeller et al. | 428/116 X |
| 3,664,906 | 5/1972 | Hartig | 428/116 |
| 3,919,445 | 11/1975 | Smarook | 428/116 |
| 4,422,183 | 12/1983 | Landi et al. | 428/116 X |
| 4,475,624 | 10/1984 | Bourland, Jr. et al. | 181/286 X |
| 4,485,568 | 12/1984 | Landi et al. | 428/116 X |
| 4,669,573 | 6/1987 | Goodman | 181/286 |
| 5,039,567 | 8/1991 | Landi et al. | 428/116 |
| 5,106,439 | 4/1992 | Wellings et al. | 156/350 X |
| 5,175,401 | 12/1992 | Arcas et al. | 181/292 |
| 5,180,619 | 1/1993 | Landi et al. | 428/116 |
| 5,496,610 | 3/1996 | Landi et al. | 156/197 X |

FOREIGN PATENT DOCUMENTS

| | | |
|---|---|---|
| 0288984 | 4/1988 | European Pat. Off. . |
| 2660787 | 4/1990 | France . |
| 3644676 | 12/1986 | Germany . |
| 3803636 | 2/1988 | Germany . |

*Primary Examiner*—Henry F. Epstein
*Attorney, Agent, or Firm*—Claude A. S. Hamrick

[57] ABSTRACT

An acoustic tile for masking the acoustic signature of a surface or submarine vessel and including an inner skin for securing the tile to the hull of the vessel, an outer water-impervious skin, and a core sandwiched between the inner and outer skins, the core being made of an expanded honeycomb structure being affixed to said inner and outer skins by thermocompression bonding.

9 Claims, 2 Drawing Sheets

5,756,182

METHOD AND APPARATUS FOR MASKING THE ACOUSTIC SIGNATURE OF VESSELS

This application is a continuation of U.S. application Ser. No. 08/003,791 filed Jan. 13, 1993 and now abandoned which is a Continuation-in-Part of our U.S. application Ser. No. 07/717,523 filed Jun. 19, 1991 now U.S. Pat. No. 5,180,619 which is a Continuation-in-Part of U.S. application Ser. No. 07/446,320, filed Dec. 4, 1989 U.S. Pat. No. 5,039,567.

BACKGROUND OF THE INVENTION

1. Field of the Invention

This invention relates to a method and apparatus for masking the acoustic signature of surface and submarine vessels, and more particularly, to the provision of a resilient honeycomb cored cladding for the hull of a vessel to provide acoustic masking.

2. Background

One of the most common methods of detecting the presence of surface and submarine vessels is the use of sonar equipment. Sonar can be classified into two basic types: i.e. active or passive sonar.

Equipment using active sonar detects the presence of a vessel by emitting a short pulse of sound ("ping") and monitoring the return of the pulse as it is reflected from the hull of the vessel. Passive sonar equipment, on the other hand, detects sound waves generated by the vessel as it moves through the water, typically vibrations produced by the vessel's propulsion system and other machinery on board.

Both active and passive sonar systems are, if the correct sophisticated equipment is used, able to produce information relating to both the position and size of the vessel detected. As such, sonar can be used to identify the vessel and, as a result, the sonar characteristics of the vessel are often called its acoustic signature. It can, particularly in military applications, be important to mask or alter the acoustic signature of a vessel, as such masking will reduce the chances of detection and identification thereof.

One method of masking the acoustic signature of a vessel that has been used in the past is known as the Masker System. This system is in use by many NATO nations and works by injecting air around the hull of the vessel. Unfortunately, the Masker System only operates within a narrow band of vessel speeds and is ineffective at speeds above 15 knots or at very low speeds where the air bubbles rise straight to the surface instead of streaming along the hull. Certain sea conditions also adversely effect the Masker System.

Furthermore, the Masker System increases the vessel's wake and this can be disadvantageous if the vessel is being attacked by wake-homing torpedoes. The Masker System also requires a supply of compressed air which itself can become a source of noise. Finally, air from the Masker System can be sucked into the cooling water intakes of the vessel, which can create additional problems as the cooling systems become inefficient.

Yet another method of masking the acoustic signature of a vessel is to install acoustic tiles in selected areas on the hull of the vessel. These tiles come in two basic varieties:

(i) decoupling tiles which deaden the sound produced by the vessel and interrupt its transmission of sounds into the water and thus help to defeat identification by passive sonars; and (ii) anechoic tiles which defeat active sonar by reducing the amount of sonic energy reflected from the hull by the "ping" produced by this type of sonar.

Unfortunately, although effective in masking the acoustic signature of a vessel, the acoustic tiles that have been used to date are relatively thick (2–2.5 inches) and heavy (25–27 lbs. for a 2'×2' tile). As a result, the tiles are both expensive to produce and expensive to install; the high installation costs being due primarily to the additional labor costs and other complications caused by the weight and thickness of the tiles. Furthermore, the tiles are difficult to secure in place during installation and require the use of complicated and expensive equipment.

There is thus a need for a lightweight and easy-to-install acoustic tile which effectively and efficiently masks the acoustic signature of a surface or submarine vessel.

SUMMARY OF THE INVENTION

Objects of this Invention

It is therefore an object of this invention to provide a lightweight, flexible acoustic tile system for installation onto the hull of a vessel to mask the acoustic signature thereof.

It is a further object of this invention to provide an acoustic tile which is made from a lightweight, durable and resilient material.

It is yet another object of this invention to provide an acoustic tile which is made of a flexible expanded honeycomb-type material.

Still another object of the present invention is to provide an acoustic tile of the type described which is easy to install without requiring complicated expensive installation equipment.

Yet a further objective of the present invention is to provide a tile of the type described which can easily be cut to size and is well suited to large-scale vacuum shoring.

Summary of Invention

Briefly, according to a preferred embodiment of this invention, an apparatus for masking the acoustic signature of a surface or submarine vessel comprises a plurality of tile-like components each including an inner skin for securing the tile to the hull of the vessel, an outer water-impervious skin, and a core sandwiched between the outer and inner skins and made of an expanded honeycomb structure.

The acoustic tile of the invention also includes a number of channels formed through in inner skin, each of the channels being in communication with a vacuum port, such that, when the tile is placed against the hull of the vessel and a vacuum is applied to the vacuum port, the resultant negative pressure in the channels serves to draw the tile into intimate engagement with the hull of the vessel. As a result, good contact and flow of the adhesive used to affix the tiles to the vessel surface is achieved.

Preferably, the tiles are made of a thermoplastic polyurethane and are 0.625 inches thick and have plan dimensions of 2'×2'. Both the inner and outer skins of the tile are fused to the honeycomb core, and the thickness of the inner skin is slightly less than that of the outer skin.

Advantages of the Invention

A primary advantage of this invention is that it provides a lightweight tile which can be used to mask the acoustic signature of a surface or submarine vessel. The light weight of the tiles means that no special lifts or shoring equipment is required for installation.

Another advantage of this invention is that the use of the acoustic tile reduces a vessel's reflectivity of transmitted sonar energy back to receiving equipment and, in turn, significantly reduces the range at which active detection of the vessel can be made.

Yet another advantage of this invention is that, in addition to reducing a vessel's acoustic signature on hostile passive sonars, use of the present invention adds to the sensitivity of the vessel's own sonar by causing the vessel to generate less self-noise into the sea. Thus, operators of on-board sonar have less background noise to work against.

Still a further advantage of this invention is that the acoustic tiles of the present invention require no additional equipment or piping, as is required by the Masker System, to provide the acoustic masking function required.

An additional advantage of the present invention is that it tends to reduce hull surface drag due to the undulating dynamics of the tile.

These and other objects and advantages of the present invention will no doubt become apparent to those skilled in the art after having read the following detailed description of the preferred embodiment illustrated in the several figures of the drawing.

DESCRIPTION OF A PREFERRED EMBODIMENTS

Figure 1:
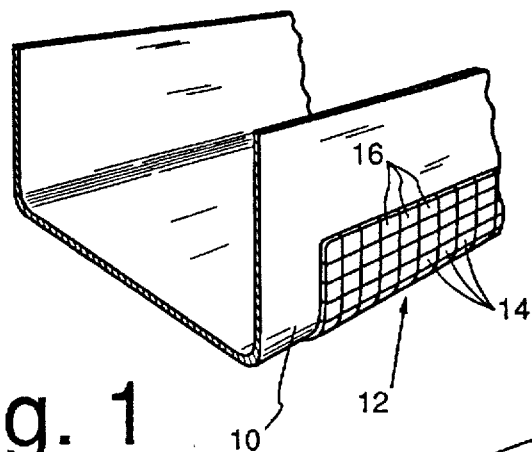
FIG. 1 is a broken perspective view illustrating in part an exemplary hull of a vessel having acoustic tiles in accordance with the present invention mounted thereon.

Referring now to FIG. 1 of the drawing, an acoustic coating system in accordance with the present invention applied to a ship hull 10 is shown generally at 12. The system is comprised of a plurality of rectangular (preferably square) tiles 14 affixed to the surface of the hull 10 by a suitable adhesive, and further includes a plurality of tapered fairing tiles 16 distributed around the system perimeter to provide a smooth transition from the hull surface to the outer surface of the tiles 14.

As is well known in the art, such tiles 14, 16 would normally be strategically positioned to cover selected areas of the ship's hull dependent upon whether the coating is intended to provide a decoupling function or an anechoic function, or both.

Figure 2:
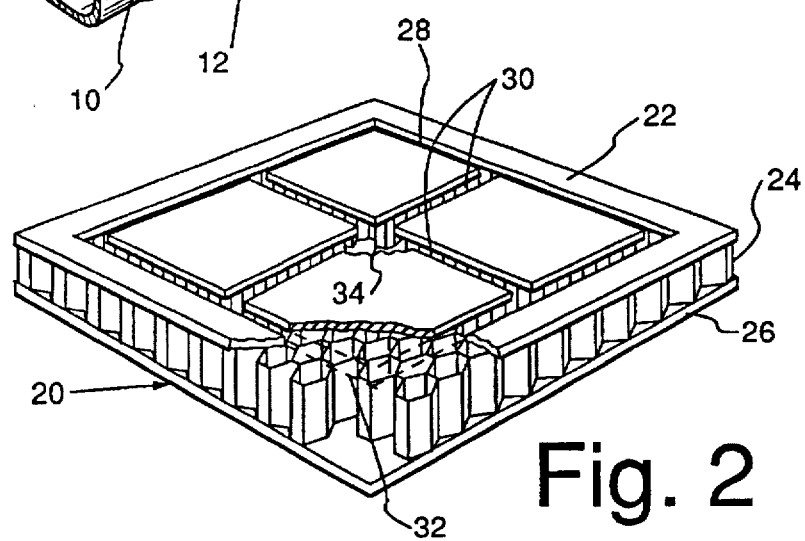
FIG. 2 is a partially broken perspective view illustrating an acoustic tile in accordance with the present invention.

The general structure of the acoustic tile of this invention is illustrated at 20 in FIG. 2 of the accompanying drawing. Typically, the tile is a square of approximately 2'×2' in plan dimension, and is comprised of a relatively thin inner skin (or "under-ply") 22, a honeycomb core 24 and a relatively thick outer skin (or "cover-ply") 26. The skin 22 is typically a sheet of 0.040" (or up to 0.100") thick thermoplastic elastomer (TPE), the core 24 is typically an expanded 0.500" thick honeycomb of TPE having wall thicknesses of 0.012" and cell diameters of 0.375", and the outer skin 26 is preferably a sheet of 0.125" thick TPE. The tiles are constructed using the method described in our earlier U.S. Pat. No. 5,039,567 entitled "Resilient Panel Having Anisotrophic Flexing Characteristics and Method of Making Same", the disclosure of which is incorporated herein by reference.

To facilitate attachment of the tiles to the ship hull, circumscribing grooves or channels 28 and crossing grooves 30 (0.125" wide) are formed in or through the inner skin 22 and into the core 24 to a depth of approximately 0.125". Layers of the tile are broken away in the foreground, and dashed lines 32 are used to illustrate the depth of the channels.

Similarly, a mid-portion of the skin 22 and underlying core 24 are also broken away to reveal a small vacuum port 34 passing through the outer skin 26 to communicate with the grooves 30 and 28.

Additional channels can be cut on site to accommodate odd sections of the hull, and can be arrayed in any suitable pattern, e.g., in straight lines, diagonal lines, zig-zag patterns, etc. Furthermore, the cells opened by the channel forming cuts may be filled with a suitable filler material so as to avoid collapse of those cells during vacuum shoring.

Figure 3:
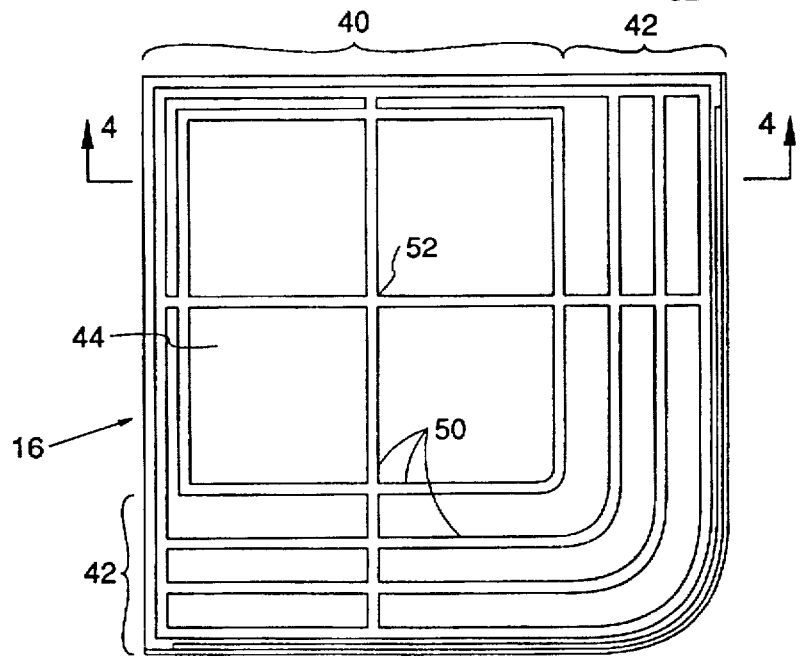
FIG. 3 is a plan view showing details of the inner skin of an integrated fairing tile in accordance with the present invention.
Figure 4:
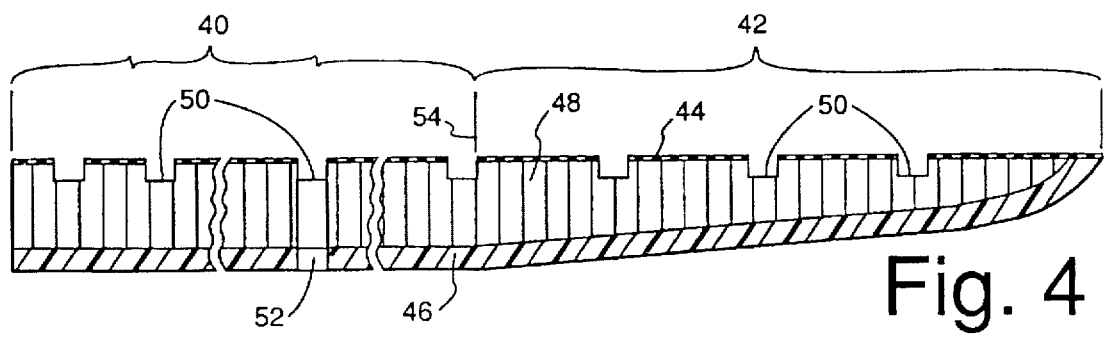
FIGS. 4–8 are enlarged cross-sections taken along the line 4—4 in FIG. 3.

Turning now to FIGS. 3 through 8, the details of a corner fairing tile 16 will be described. Note that FIG. 3 is a plan view of the inner skin side and FIGS. 4 through 8 are broken cross-sections taken along the line 4—4 in FIG. 3. The fairing tile is comprised of a generally flat area 40 and a gradually tapering portion 42 disposed along two sides of the tile. A simple edge fairing tile would obviously taper only along one side. The tapered portion 42 serves to streamline the tile so that it provides a minimum flow resistance to the vessel hull as it moves through the water.

Like the previously described rectangular tile, the typical fairing tile includes a thin inner skin 44 and a thicker outer skin 46 (FIG. 4) which sandwich between them a core 48. The thin inner skin 44 is typically 0.04" to 0.100" thick, while the thickness of the outer skin 46 is typically at least 0.125" thick. The core at the flat portion 40 of the tile is approximately 0.5" thick and comprises a honeycomb structure of the type described above. The tapered core portion 42 is identical in configuration to that of the flat portion (and may in fact be an integral part of portion 40) except that it has been shaved, trimmed, or otherwise altered to provide the desired taper. The inner and outer skins 44 and 46, and the core 48 are all made of a thermoplastic polyurethane and are fused together to form a single, watertight, unitary construction, i.e., an integrated acoustic tile and fairing piece.

Figure 5:
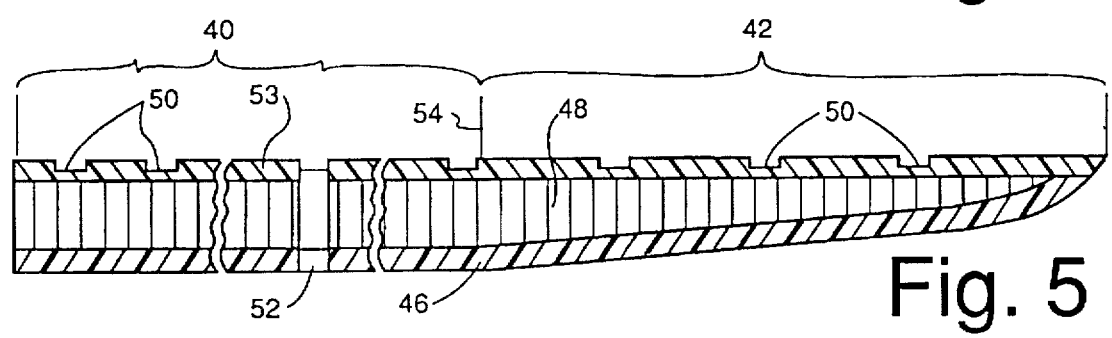

Both the flat and tapered portions 40, 42 of the tile have a number of grooves or channels 50 formed in or through the inner skin 44. As is apparent from the drawing, these channels are all interconnected and lead either directly or indirectly to a vacuum port 52 formed through the honeycomb and outer skin of the tile. The port 52 can be of any suitable configuration ranging from a simple puncturable membrane to an elaborate valving structure. In some cases it may be desirable to use a somewhat thicker inner skin 53 as depicted in FIG. 5, so that the channels 50 can be molded or cut thereinto. As one example, the inner skin, or underply, 53 was made of a layer of material 0.090" thick with 0.070" deep channels 50. The benefit of using this format for the tiles and fairing tiles is that when the shoring vacuum is applied, the tiles will not experience dimpling.

Figure 6:
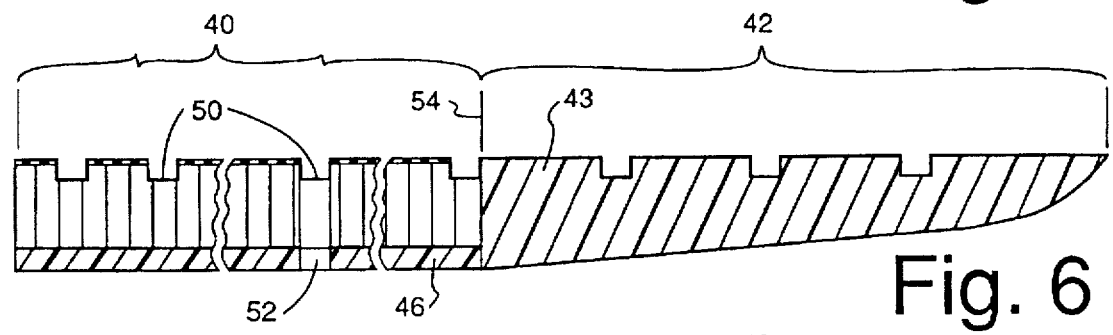

The tapered portion 42 of the tile can be constructed in several ways: One method is to pre-form or trim the honeycomb core 48, as described above, and thereafter cast a pourable thermoplastic polyurethane to form the sloping outer skin. As an alternative, the entire sloping portion 42 can be made of a cast elastomeric material or foam which, as shown at 43 in FIG. 6, is then joined to the rectangular core 40 at line 54, the transition between the sloping portion 42 and the flat portion 40. The cast elastomer would have similar acoustic masking properties to the honeycomb core making up the rest of the tile. However, as the sloping portions 42 represent a relatively small percentage of the total area on the hull covered by acoustic tiles, these properties need not be as good as that of the honeycomb structure. In addition, the fairings are usually angled and would, in any event, not reflect sound from active sonar as well as other parts of the hull of the vessel.

Figure 7:
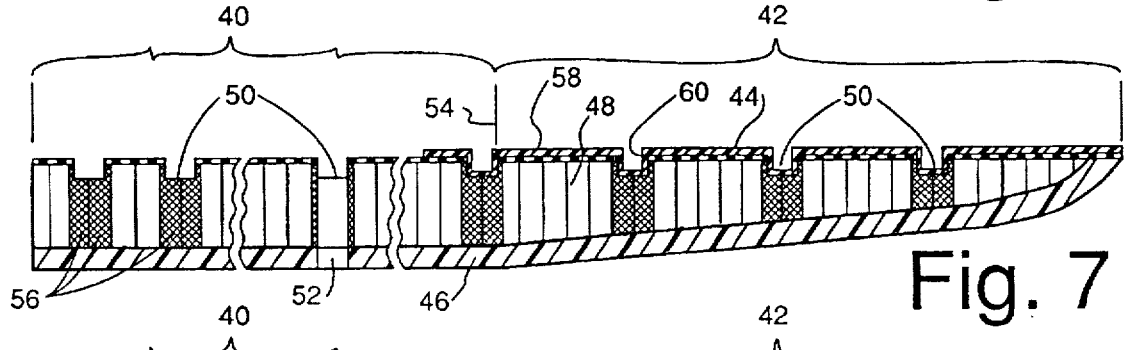

As depicted in FIG. 7, it is sometimes preferable to fill the cells 56, that have been opened during the channel forming process, with a suitable material, so as to prevent partial collapse of those cells during the vacuum shoring process. In addition, it may also be desirable to bond an inner liner 58, having preformed channels 60, to the skin 44. Alternatively, a plastic elastomer could be cast over the scored inner side to accomplish a result similar to that achieved by the layer 58.

Figure 8:
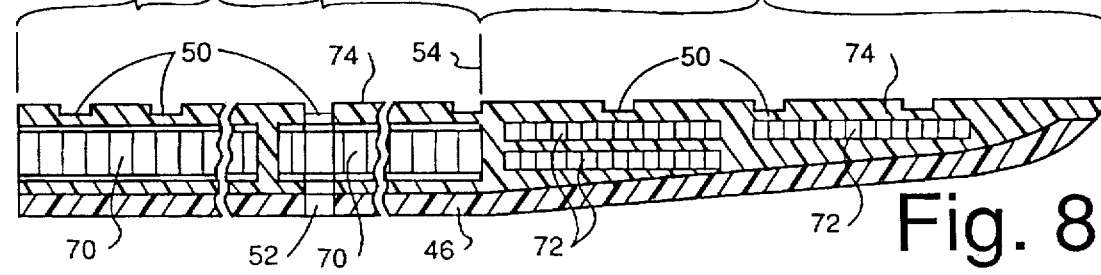

In order to save costs, it may be desirable to use yet another configuration such as is depicted in FIG. 8, wherein the outer skin 46 is shaped, in the fairing tile case, and smaller honeycomb pads 70 and 72 are positioned thereover and then cast in place with a suitable resilient material 74. Note that in order to accommodate the tapered edges, thinner pads 72 with the same, or a different, cell size may be stacked as indicated.

When the tile is to be secured to the hull of a vessel, the inner skin 44 is first abraded or treated with a urethane primer. An adhesive, preferably an epoxy or a pressure-sensitive adhesive, is then applied thereto (and to the hull) and the tile is positioned and held in place against the hull. A vacuum is then applied at the port 52 to reduce the pressure in the channels 50 and cause the tile to be drawn into firm engagement with the hull. The vacuum port 52 can then be sealed off and the tile held in position by the combination of adhesive and vacuum or, alternatively, if the vacuum is removed, by the adhesive alone. As the tiles are installed in side-by-side relationship, a suitable adhesive or silicone caulk is applied at the tile edges to permanently seal the junctions between the tiles. It is important to note that the entire panel must be air-tight so that in use no sea water is able to leak into or under any part of the panel.

Once the tiles have been fitted onto the hull of the vessel, the outer skin 46 can be coated with an anti-foulant, which reduces the amount of marine growth on the exterior on the hull of the vessel.

Although the present invention has been described above in terms of a specific embodiment, it is anticipated that alterations and modifications thereof will become apparent to those skilled in the art. It is therefore intended that the following claims be interpreted as covering all such alterations and modifications as may fall within the true spirit and scope of the invention.

What is claimed:

1. An acoustic tile for masking the acoustic signature of a surface or submarine vessel comprising:

a flexible inner skin of a first thickness and having an inner surface and an outer surface, the inner surface of said inner skin being adapted for adhesive attachment to the hull of the vessel;

a resilient water-impervious outer skin of a second thickness having an inner surface and an outer surface;

a core formed of elongated undulated strips of resilient thermoplastic material, thermal compression bonded together and forming flexible cell walls defining a plurality of contiguous, regularly shaped cells, said core having a first face formed by a first extremity of said cell walls and a second face formed by a second extremity of said cell walls, said first face being thermal compression bonded to said outer surface of said inner skin and said second face being thermal compression bonded to said inner surface of said outer skin;

an adhesive material disposed on said inner surface of said inner skin, for attaching said inner skin to the hull of said vessel;

a vacuum port formed in said tile and located on the outer skin of said tile, said vacuum port extending through said outer skin, said core and said inner skin; and a plurality of interconnected, open channels formed in said inner surface of said inner skin, each of said channels being in communication with said vacuum port such that a negative pressure applied to said vacuum port when said tile is placed against said hull of said vessel tends to create a vacuum between said inner surface of said inner skin and said hull, thereby enhancing engagement of the tile with the hull of the vessel so that said adhesive material fixedly engages said tile to said hull.

2. An acoustic tile according to claim 1 wherein the tile is made of a thermoplastic polyurethane.

3. An acoustic tile according to claim 2 wherein said tile includes a planar portion having a first uniform tile thickness and a first tapered portion extending from said planar portion, said tapered portion having a non-uniform tile thickness transitioning from said first tile thickness at said planar portion to a second tile thickness less than said first tile thickness at a bounding edge of the tile.

4. An acoustic tile according to claim 3 wherein said tile also includes a second tapered portion extending from said planar portion such that said planar portion, said first tapered portion and said second tapered portion all lie in substantially the same plane.

5. An acoustic tile according to claim 3 wherein said channels are formed in both said planar portion and said first and second tapered portions.

6. An acoustic tile according to claim 1 wherein said inner skin has a thickness of at least 0.040 inches, said core has a thickness of at least 0.500 inches, and said outer skin has a thickness of at least 0.125 inches.

7. An acoustic tile according to claim 1 including a planar portion having a first uniform tile thickness and a first tapered portion extending therefrom, said first tapered portion having a non-uniform tile thickness transitioning from said first thickness at said planar portion to a second tile thickness less than said first tile thickness at a bounding edge of the tile.

8. An acoustic tile according to claim 7 wherein said tile also includes a second tapered portion extending from said planar portion such that said planar portion, said first tapered portion and said second tapered portion all lie in substantially the same plane.

9. An acoustic tile according to claim 1 wherein said first thickness is less than said second thickness.

* * * * *